Aug. 16, 1927.
C. HOFLAND
1,639,608
HITCH FOR DRAFT ANIMALS
Filed March 24, 1926
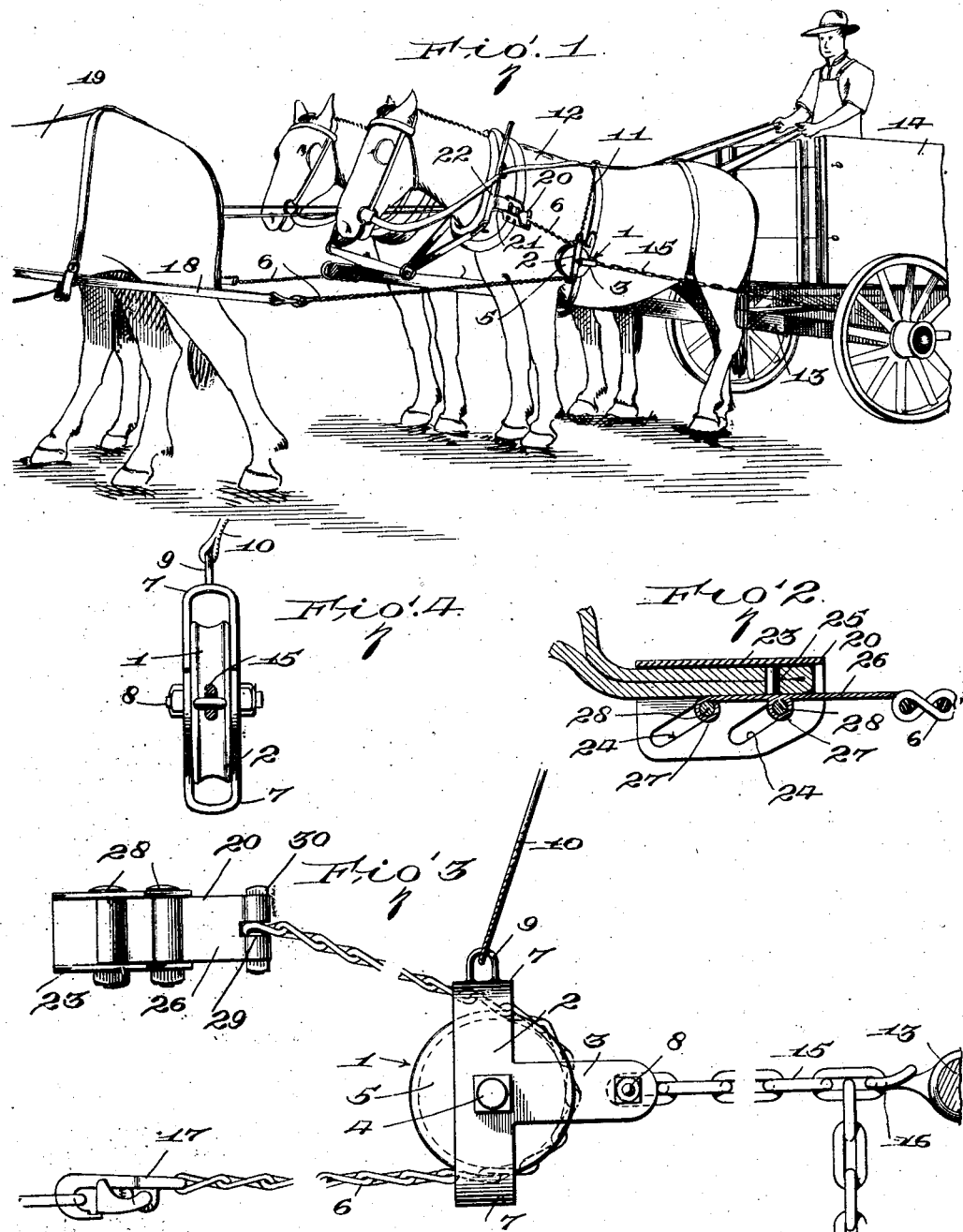
INVENTOR
C. Hofland
BY
ATTORNEYS
WITNESSES Patented Aug. 16, 1927.

1,639,603

UNITED STATES PATENT OFFICE.

CHRISTIAN HOFLAND, NEWBURG, NORTH DAKOTA.

HITCH FOR DRAFT ANIMALS.

Application filed March 24, 1926. Serial No. 97,048.

My invention relates to improvements in hitches for draft animals, and it consists in the combinations, constructions and arrangements herein described and claimed.

An object of the invention is the provision of a simple and reliable hitch or draft gear which affords facilities for connecting draft elements of the harness of two draft animals which are arranged one in front of the other so that both of said animals may exert a pull in a substantially straight line and the draft on both of the animals when the rear animal is hitched to a wagon or other vehicle or agricultural implement will be substantially equalized.

Other objects and advantages of the invention will be apparent from the following description, considered in conjunction with the accompanying drawings, in which Figure 1 is a perspective view showing the harness of two teams of draft animals connected by hitches embodying the invention, Figure 2 is a longitudinal vertical section through a coupling for connecting one end of a flexible draft member which is used in the hitch with a strap on a hame of the rear draft animal, Figure 3 is a side elevation of the improved hitch, and Figure 4 is an edge view of a draft pulley which is included in the hitch.

A hitch embodying the invention comprises a draft pulley generally indicated at 1. The frame of the pulley 1 comprises a substantially elliptical hollow head 2 having integral parallel arms 3 extending from opposite portions of corresponding side edges of the head 2 and constituting an attaching stem for the pulley frame. A pivot element 4, which may be a bolt, as shown, extends transversely across the hollow head 2 of the frame along the minor axis of the head 2 and supports a sheave 5 which is freely rotatable on the pivot element 4 between the side portions of the head 2 and between the arms 3. The head 2 therefore functions as a guard to prevent a chain 6, or a like flexible motion transmitting element, from disengaging the peripherally grooved sheave 5. Also, the portions of the body of the head 2 at the opposite ends of the major axis of the head, indicated at 7, will serve as stops for limiting the swinging movement of the opposite ends of the chain 6 away from each other and away from the adjacent portions of the periphery of the sheave 5. A transverse draft bolt 8 extends between the outer end portions of the arms 3 of the stem of the frame of the draft pulley.

One of the portions 7 of the head of the pulley frame has a shackle 9 joined thereto integrally or otherwise. A suspension member, such as the rope 10, may be connected with the shackle 9 and engaged with the back pad 11 of the harness of the draft animal, as 12, whereby the pulley 1 will be suspended at the outer side of the draft animal 12. The stem of the pulley frame then may be connected with the outer end of a singletree 13 or like part of a wagon 14 or other vehicle or implement through the medium of a trace 15. The trace 15 is shown as being a chain which is connected at its forward end with the bolt 8 and has a link thereof detachably engaged with a hook 16 on the outer end of the singletree 13.

One end of the chain 6 may be provided with a hook 17 or other fastening device for securing that end of the chain 6 to the rearward end of the corresponding trace 18 of the harness of a draft animal 19 that is positioned directly in front of the draft animal 12. The other end of the chain 6 is connected by a coupling 20 and a strap 21 with the adjacent hame 22 on the collar of the rear draft animal.

The coupling 20 is shown as comprising a substantially U-shaped frame 23 having each side member thereof provided with one or more inclined slots, as at 24 in Figure 2, corresponding slots of the two side members of the frame 23 of course being aligned. A holding pin 25 is carried by the web of the frame 23 between the side members of the frame. A clamping plate 26 is adapted to move bodily between the side members of the frame 23 and has transverse eye or sleeve portions 27 on its outer face embracing transverse fastening elements 28 which are shown as being bolts having opposite end portions thereof in sliding engagement with corresponding slots 24 in the side members of the frame 23. The clamping plate 26 therefore will move toward and away from the web of the frame 23 according to the direction of movement of the bolts 28 in the associated slots 24. When the bolts 28 are at the rear ends of the slot 24, the clamping plate 26 will be close to if not actually in abutting relation to the outer end of the projection 25. The outer end of the plate 26 may have a cut-away portion at 29 intermediate its width for the reception of the adjacent end of the chain 6, which is held against displacement from the cut-away portion 9 by a transverse fastening element, such as the bolt 30. The strap 21 may be extended around the hame 22 and the ends thereof may be projected between the web of the frame 23 and the clamping plate 26 when the latter is at the limit of its movement away from the web of the frame 23 and the ends of the strap 21 are arranged on the web of the frame 23 so that the projection 25 extends through aligned apertures in the end portions of the strap. A pull on the clamping plate 26 will cause the ends of the bolts 28 to ride along the slots 24 with which they are associated until the clamping plate 26 is in a position to prevent displacement of the ends of the strap 21 from engagement with the projection 25 and the ends of the strap 21 are clamped against the web of the frame 23. The clamping action of the plate 26 will be positively maintained so long as there is a pull on the chain 6.

From the foregoing description of the various parts of the device, the operation thereof may be readily understood. Two of the hitches will be employed to connect the rear team of draft animals shown in Figure 1 with the front or leading team of draft animals. Each hitch of course will be disposed at the outer side of the animals which it connects. The draft on the animals or teams of animals which are connected by means of a hitch arrangement embodying the invention will be equalized and the hitched together animals or teams of animals are permitted to pull in a substantially straight line. Moreover, the animals which are in line with each other and are connected by means of the hitch are compelled to pull steadily to avoid being pulled rearwardly by the other draft animal or animals.

Obviously, my invention is susceptible of embodiment in forms other than that which is illustrated in the accompanying drawings and I therefore consider as my own all such modifications and adaptations of the form of the device herein described as fairly fall within the scope of the appended claims.

I claim:—

1. In a draft gear, a pulley suspended from the harness of a draft animal, a draft member connecting the frame of the pulley with a vehicle or implement that is to be drawn, a chain in engagement with the sheave of the pulley, means at one end of the chain for connecting the latter directly with the trace of a harness of the leading draft animal, and a coupling and strap arrangement for connecting the other end of the chain directly with a hame of the harness of the first named draft animal.

2. In a draft gear of the character described, a pulley comprising a frame substantially elliptical in cross sectional contour and a sheave supported for rotation between the side portions of the frame and about an axis substantially coincident with the minor axis of the frame, said frame including a pair of arms respectively disposed at opposite sides of said sheave and extending in parallel relation to each other, means connecting said arms with a vehicle or implement that is to be drawn, means whereby said pulley frame is suspended from the harness of a draft animal, a chain passed about the periphery of the sheave between the side portions of the pulley frame, means at one end of said chain for connecting the latter with a hame of the draft equipment of said draft animals, and means at the opposite end of the chain for connecting the chain with the trace of the harness of the leading draft animal.

3. In a draft gear of the character described, a pulley comprising a frame substantially elliptical in cross sectional contour and a sheave supported for rotation between the side portions of the frame and about an axis substantially coincident with the minor axis of the frame, said frame including a pair of arms respectively disposed at opposite sides of said sheave and extending in parallel relation to each other, means connecting said arms with a vehicle or implement that is to be drawn, means whereby said pulley frame is suspended from the harness of a draft animal, a chain passed about the periphery of the sheave between the side portions of the pulley frame, means at one end of said chain for connecting the latter with a hame of the draft equipment of said draft animal, and means at the opposite end of the chain for connecting the chain with the trace of the harness of a leading draft animal, the portions of the elliptical frame at the ends of the major axis of said elliptical frame constituting bars and stop members for preventing said chain from disengaging the periphery of the sheave and for limiting the swinging movements of the ends of the chain away from each other and away from the adjacent portions of the periphery of the sheave.

CHRISTIAN HOFLAND.